(12) United States Patent
Eicher et al.

(10) Patent No.: US 10,268,958 B1
(45) Date of Patent: Apr. 23, 2019

(54) RECOMMENDED LAUNCH CONFIGURATION

(71) Applicant: Amazon Technologies, Inc., Reno, NV (US)

(72) Inventors: Anton André Eicher, Western Cape (ZA); Matthew James Eddey, Seattle, WA (US); Richard Alan Hamman, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 1054 days.

(21) Appl. No.: 14/482,872

(22) Filed: Sep. 10, 2014

(51) Int. Cl.
*G06N 5/04* (2006.01)
*G06N 99/00* (2019.01)

(52) U.S. Cl.
CPC ............ *G06N 5/04* (2013.01); *G06N 99/005* (2013.01)

(58) Field of Classification Search
CPC ................................ G06N 99/005; G06N 5/04
See application file for complete search history.

(56) References Cited

U.S. PATENT DOCUMENTS

| | | | | |
|---|---|---|---|---|
| 6,414,697 B1* | 7/2002 | Amro | ................. | G06F 3/04817 715/762 |
| 2007/0067428 A1* | 3/2007 | Ogawa | ................. | H04L 12/5695 709/223 |
| 2008/0301574 A1* | 12/2008 | Sanghvi | .............. | G06F 11/3466 715/771 |
| 2010/0269109 A1* | 10/2010 | Cartales | ................ | G06F 9/5072 718/1 |
| 2010/0325191 A1* | 12/2010 | Jung | ....................... | G06F 15/16 709/202 |
| 2010/0332643 A1* | 12/2010 | Benari | .................. | G06F 9/5077 709/224 |
| 2011/0225583 A1* | 9/2011 | Suh | ....................... | G06F 9/4887 718/1 |
| 2012/0005237 A1* | 1/2012 | Obata | ................. | G06F 9/45537 707/798 |
| 2012/0151062 A1* | 6/2012 | Gusev | ................... | G06F 9/5011 709/226 |
| 2013/0060933 A1* | 3/2013 | Tung | ................... | G06F 11/3495 709/224 |
| 2013/0139152 A1* | 5/2013 | Chang | ................. | G06F 9/45545 718/1 |

(Continued)

*Primary Examiner* — Alan Chen
(74) *Attorney, Agent, or Firm* — Thorpe North & Western, LLP.

(57) ABSTRACT

A technology is described for providing a recommended launch configuration for a computing instance based on a predicted launch time. An example method may include receiving a launch plan to launch a computing instance on a physical host within a computing service environment, where the launch plan includes a launch configuration. Upon receiving the launch plan, a predicted launch time may be determined for the computing instance based on the launch configuration. The launch configuration may then be analyzed to identify changes to the launch configuration that may result in an improved predicted launch time as compared to the predicted launch time. A recommended change may then be provided for the launch configuration as a result of a determination that the change to the launch configuration results in the improved predicted launch time.

20 Claims, 8 Drawing Sheets

(56) References Cited

U.S. PATENT DOCUMENTS

| | | | |
|---|---|---|---|
| 2014/0040473 A1* | 2/2014 | Ho | G06F 9/5072 |
| | | | 709/226 |
| 2014/0215464 A1* | 7/2014 | Birke | G06F 9/45533 |
| | | | 718/1 |
| 2014/0297868 A1* | 10/2014 | Ennaji | H04L 47/828 |
| | | | 709/226 |
| 2015/0074749 A1* | 3/2015 | Vasko | G05B 19/4185 |
| | | | 726/1 |
| 2016/0380908 A1* | 12/2016 | Larsson | G06F 9/5072 |
| | | | 709/226 |

* cited by examiner

RECOMMENDED LAUNCH CONFIGURATION

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing customers with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Launching one or more computing instances on a single physical computing machine may entail identifying available computing resources (e.g., physical hosts) on which a computing instance may be loaded and executed. A time to load and launch a computing instance on a single physical computing machine may vary due to various aspects of the computing environment containing the single physical computing machine and aspects of the computing instance being launched. As a result, a launch time for a computing instance may range from a few minutes to several minutes.

DETAILED DESCRIPTION

Figure 1:
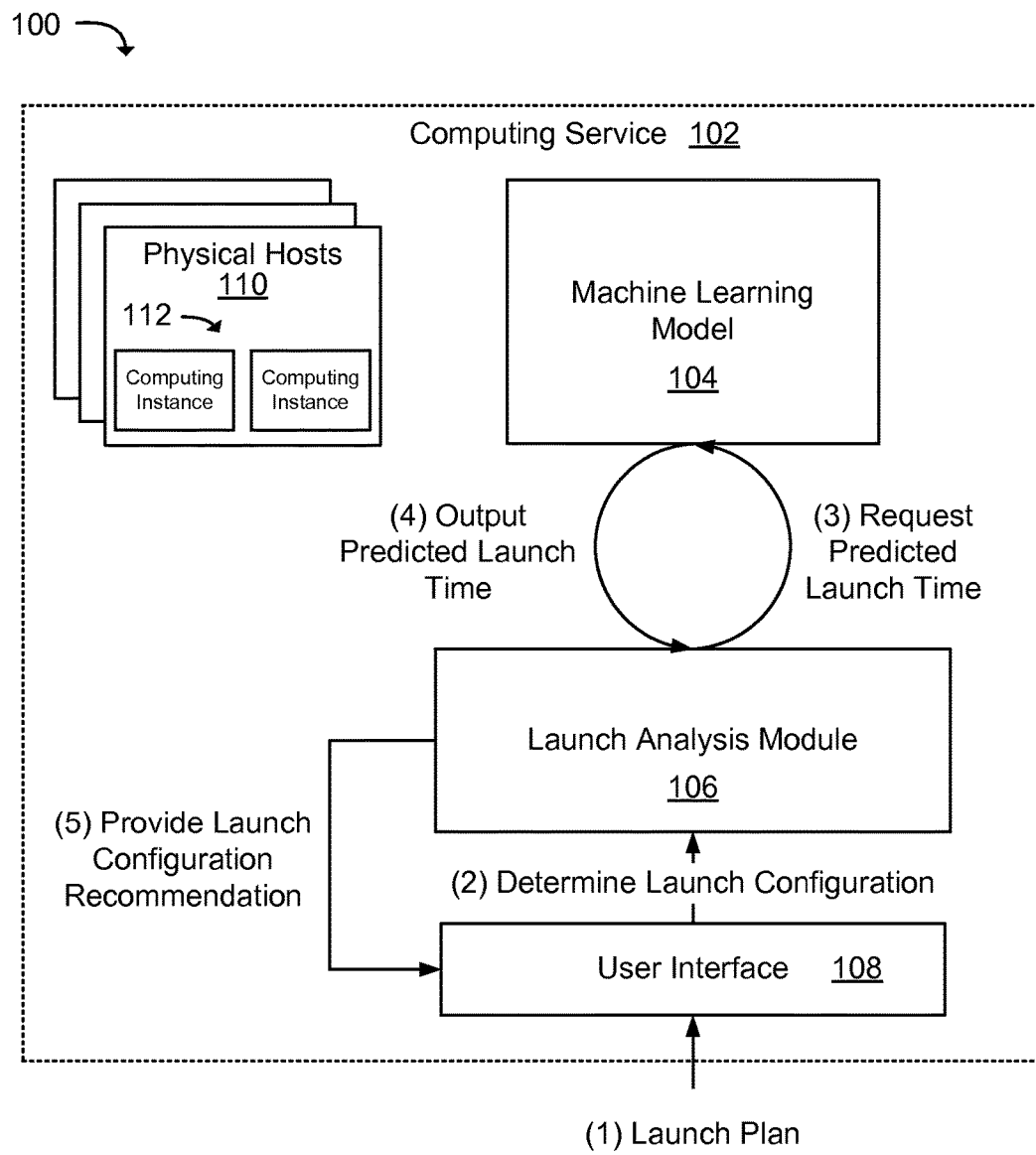
FIG. 1 is a block diagram illustrating an example system for determining a recommended launch configuration using a predicted launch time.

A technology is described for providing a customer with a recommended change to a launch configuration that may result in an improved predicted launch time. In one example of the technology, a recommended change to a launch configuration may be generated in response to a request by a customer to launch a computing instance on a physical host within a computing service. The request may be a request to immediately launch one or more computing instances or may be a request to evaluate a launch plan for a computing instance launch. A launch plan may be a set of specifications (e.g., hardware and/or software) for a computing instance launch. As referred to in this disclosure, a computing instance may be a virtual machine (e.g., an instance of a software implementation of a computer) that executes applications like a physical machine. A computing service may be a network accessible service that provides customers with network accessible computing instances.

Upon receiving the launch request, a predicted launch time (e.g., a time to launch the computing instance on the physical host) may be obtained for the launch request using launch features in a launch configuration for the computing instance. A launch configuration, in one example, may provide specifications for launching a computing instance (e.g., a computing instance type, a physical host, a number of computing instances being launched, etc.). The launch features (i.e., data for the launch features) may then be submitted to a machine learning model that generates a predicted launch time. After obtaining the predicted launch time, the launch configuration for the computing instance may be analyzed to identify one or more features of the launch configuration that, if modified, may improve the launch time for the computing instance. For example, a feature of the launch configuration may be modified and a second predicted launch time for the modified launch configuration may be obtained and compared to the first predicted launch time. In a case where the modification to the launch configuration results in an improved predicted launch time, a recommendation for a launch configuration that includes the modification may then be provided to a customer.

A launch time for a computing instance, in one example, may be influenced by a launch configuration included in a launch request. In particular, certain features of a launch configuration may be within a customer's control and a launch configuration choice selected by the customer may significantly influence the launch time of the computing instance. For example, one feature of a launch configuration that may be within a customer's control may be the selection of a data center within a particular geographic region where the computing instance will be hosted. Selection of a data center in first geographic region as opposed to selecting a second geographic region may influence a launch time. As a result of the technology, a computing service provider may provide a customer with an estimate of when a computing instance may be available for use based on a launch configuration that is at least partially determined by a customer, and recommend a change to the launch configuration that may result in a faster launch time.

FIG. 1 is a diagram illustrating a high level example of a system 100 that may be used to provide a recommendation for a launch configuration that may result in an improved launch time of a computing instance 112. The system 100 may include a computing service 102 having a launch analysis module 106 configured to analyze a launch configuration using a predicted launch time provided by a machine learning model 104 and configured to determine one or more recommendations for the launch configuration. Also included in the computing service may be a number of physical hosts 110 that execute computing instances 112 via an instance manager, such as a hypervisor.

In one example configuration, a launch plan (1) for a computing instance launch may be submitted by a customer via a user interface 108. The launch plan may be a set of specifications for a computing instance launch (e.g., computing instance type and size, machine image configuration, data center region, etc.). Upon receiving the launch plan, a launch configuration may be determined (2) for the launch request. More specifically, specifications for launching the computing instance may be determined. Illustratively, specifications that may be included in a launch configuration may include a machine image configuration for a computing instance 112, a number of computing instances to be launched, a data center within a geographic region containing a physical host 110 that will execute the computing instance 112, a computing instance type, a network type, as well as other specifications not specifically mentioned.

Alternatively, a launch request for a computing instance launch may be received at a control plane for the computing service 102. Upon receiving the launch request, a launch configuration may be determined for the launch request (i.e., specifications for launching the computing instance may be determined). For example, the launch request may be a request to immediately launch the computing instance on a physical host 110.

Some specifications of a launch configuration may be controlled by a customer, and other specifications may be determined by a computing service provider. For example, a customer may specify a computing instance type, a machine image configuration, a geographic region of the data center hosting the computing instance, as well as other features of the launch configuration. Whereas, a computing service provider may determine, among other features of a launch configuration, a physical host 110 used to execute a computing instance, a hardware brand and hardware architecture of the physical host 110, network hardware used to enable communication with a computing instance, caching of machine images within a specific data center, etc.

In one example, specifications for the launch configuration may be obtained from parameters included in the launch plan. For example, a launch plan may include parameters specifying a computing instance type, the number of computing instances to be launched, a machine image used to create the computing instance(s), etc. In addition, launch configuration specifications may be obtained from stored launch parameters. For example, stored launch parameters may specify a customer's virtual private network, a customer's preferred geographic region, and other specifications that may be included in a customer's profile.

Once the launch configuration has been determined by identifying specifications of the launch configuration, the launch configuration may then be analyzed to identify launch features. The launch features may be individual properties of a computing instance launch that may be represented by a value (e.g., a scalar, Boolean, numerical, alphabetic, defined set or other value). Examples of launch features may include, but are not limited to: a machine image and a kernel image used to create a computing instance 112, an operating system and network type, a geographic region where a physical host 110 is located, a maximum number of computing instances that a physical host 110 may be capable of executing, a number of contending computing instances on a physical host 110, and the like.

After identifying the launch features, values representing the launch features may be obtained. For example, a value for a launch feature may be included in a launch configuration (e.g., a number of computing instances to be launched) and/or information included in the launch configuration may be used to locate and obtain a value associated with a launch feature. The values for the launch features may then be included in a request made to a machine learning model 104 for a predicted launch time (3) for the launch plan.

The machine learning model 104 may then generate a predicted launch time using the values for the launch features and output the predicted launch time (4) for use by the launch analysis module 106. In one example, the predicted launch time may be the time between receiving a launch request (e.g., a computing instance state is "pending") and the start of computing instance boot (e.g., the computing instance state is "running"). The predicted launch time may then be used in analysis to improve computing instance launch times. Namely, the predicted launch time may be a factor in advising customers of computing instance configurations that may result in faster launch times.

In one example configuration, the launch configuration may be analyzed to determine whether a change to the launch configuration may result in an improved predicted launch time. In analyzing the launch configuration, those specifications under the control of the customer may be analyzed to determine whether modifying the launch configuration specification improves the predicted launch time. Launch features (i.e., launch features with their related values) corresponding to the modified specifications may then be provided to the machine learning model 104 (along with the original launch features used to obtain the first predicted launch time) to obtain a second predicted launch time. The second predicted launch time may then be compared with the first predicted launch time to determine whether the modified launch configuration resulted in an improved predicted launch time. Illustratively, modification of the launch configuration, and obtaining a predicted launch time for the modified launch configuration, may be performed iteratively to identify a predicted launch time that is an improvement over other predicted launch times produced via iteratively modifying the launch configuration. Thus, any number of different launch configurations (e.g., tens or hundreds of launch configurations stemming from the customers original launch plan) may be analyzed to determine if a launch configuration recommendation with a lower launch time may be made to a customer.

Selecting one or more specifications of the launch configuration to modify may be determined based on the state of the computing service. For instance, the state of the computing service 102 may be analyzed to identify computing service components that may be contributing to slower computing instance launch times. Specifications included in the launch configuration that may be associated with a problem computing service component may be selected for analysis. As a specific example, analysis of the state of the computing service 102 may show that launch times for a data center in a geographic region selected by the customer are slower as compared to a data center in another geographic region. As such, the geographic region specified in the launch configuration may be selected to determine whether selecting an alternative geographic region may result in an improved predicted launch time.

In addition, specifications of the launch configuration selected for recommended modification may be based on heuristics that are known to affect a predicted launch time. For example, specifications of the launch configuration that correlate with known heuristics may be identified and modified according to the heuristic. As a specific example, caching a machine image used to create a computing instance on a physical host 110 may be shown to improve launch times for computing instances created using the machine image, as compared to retrieving the machine image from a remote storage device. Therefore, the launch configuration specification for a machine image may be selected to determine whether a machine image similar to that selected by the customer may be cached on a physical host 110 available to host a computing instance.

After determining one or more modifications to the launch configuration that are within the control of the customer that result in an improved predicted launch time, a recommendation may be provided to the customer, via an automated notification, detailing the modifications that can be made by the customer. As an example, the recommendation may be displayed in an interactive graphical user interface, such as a command interface, a dashboard, other type of electronic page, network application or the like. A customer may then manually make changes to the launch configuration, or in one example, automatically apply the recommended changes to the launch configuration by selecting an associated control in the interactive graphical user interface.

One example of a launch configuration recommendation made to a customer may include recommending a staged timetable of when to launch a plurality of computing instances in response to a determination that the staged timetable may result in an improved predicted launch time. For example, a launch plan or a launch request may be for a group of computing instances (e.g., tens, hundreds or thousands of computing instances). Launching the group of computing instances at the same time may significantly affect a launch time for the group of computing instances. As a result, a determination may be made that if the customer modifies the launch configuration by staging the launches of the computing instances (e.g., dividing the group of computing instances into smaller groups and launching the smaller groups over a staged time period), then a launch time to launch the group of computing instances may be improved.

A second example of a launch configuration recommendation made to a customer may include recommending a machine image configuration in response to a determination that the machine image configuration may result in an improved predicted launch time. As one illustration, a launch configuration may specify a machine image having a particular operating system (e.g., Windows Server 2008). A recommendation may be made that the launch configuration be modified to specify a machine image having a newer version of the operating system (e.g., Windows Server 2012) because the machine image having the newer version of the operating system is cached on a physical host selected to host a computing instance associated with the launch configuration.

A third example of a launch configuration recommendation made to a customer may include recommending a data center in a geographic region containing a physical host that may be used to host a computing instance in response to a determination that the selection of the data center may result in an improved predicted launch time. For example, a recommendation may be provided to a customer for a data center that may be located in a geographic region that is closer in proximity to a customer than a data center originally selected by the customer.

Additional recommendations for changes to a launch configuration may include a computing instance type recommendation (e.g., recommending a large computing instance in place of two small computing instances), a recommendation of a time of day or month to launch a computing instance (e.g., an estimated time of day or month when computing resources used to launch computing instances is expected to be lower), a recommendation for various computing instance attachments (e.g., network, storage, etc.) that may result in improved launch times, as well as other launch configuration recommendations not specifically mentioned herein. The recommended changes to a launch configuration described above are illustrative and not conclusive. Many other launch configuration recommendations are possible and are within the scope of this disclosure.

Figure 2:
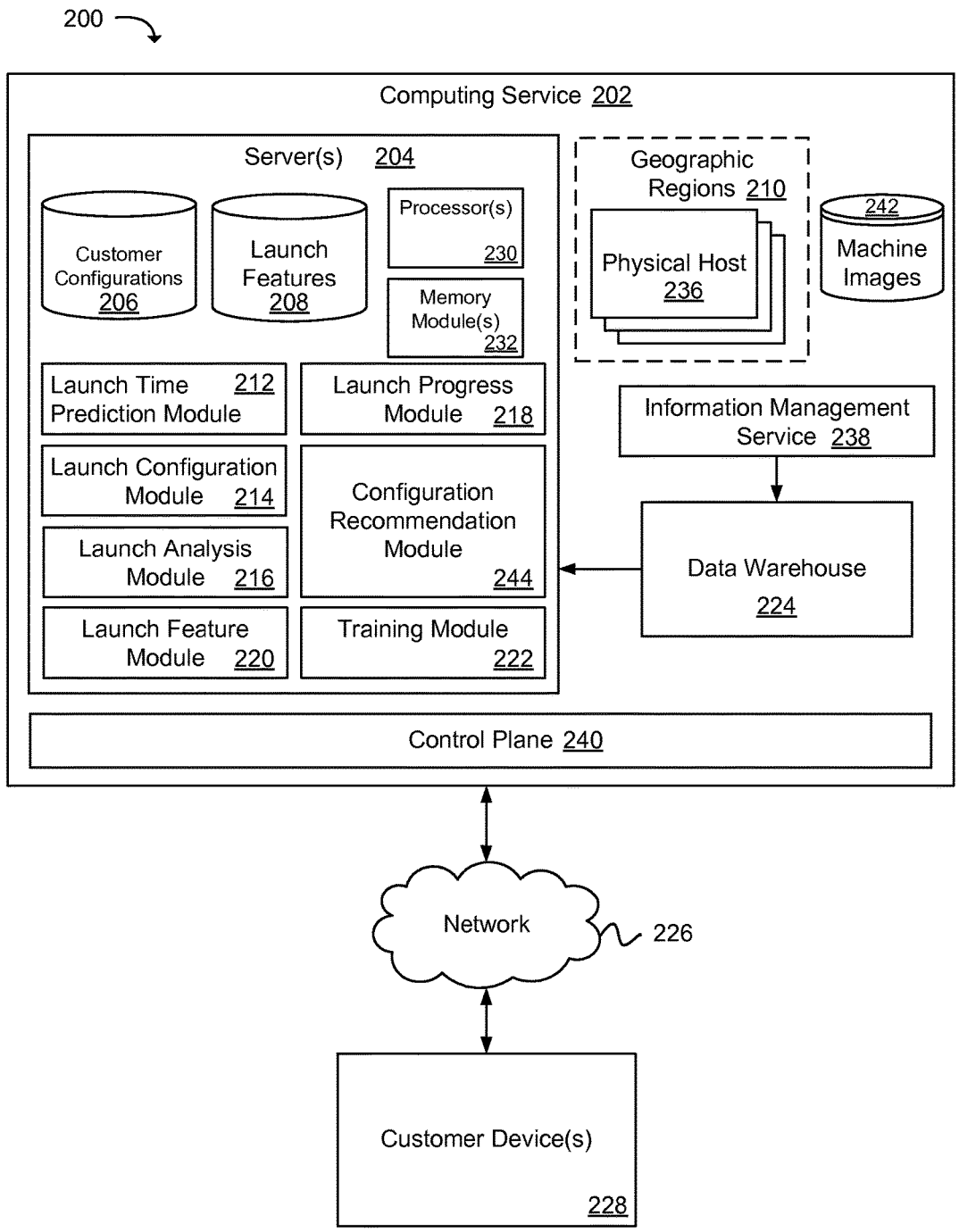
FIG. 2 is a block diagram that illustrates various example components included in a system for providing a recommended launch configuration based on a predicted launch time.

FIG. 2 illustrates components of an example system 200 on which the present technology may be executed. The system 200 may include a computing service environment 202 that may be accessible to a number of customer devices 228 via a network 226. The computing service environment 202 may provide customers with network accessible services, such as computing instances that execute on physical hosts 236. Included in the computing service environment 202 may be a server 204 that hosts a launch time prediction module 212 that may be used to generate predicted launch times for computing instances launched on the physical hosts 236. In addition to the machine learning module 212, the server 204 may contain a launch configuration module 214, a launch analysis module 216, a launch progress module 218, a training module 222, a launch feature module 220, a configuration recommendation module 244 and one or more data stores having data that may be accessible to the modules contained on the server 204.

In one example configuration, the launch time prediction module 212 may be configured to generate predicted launch times for computing instances placed on physical hosts 236 located within the computing service environment 202. For example, as illustrated in FIG. 2, the launch time prediction module 212 may be executed within the computing service environment 202 and may provide predicted launch times for computing instances launched in the computing service environment 202. In another example configuration, the launch time prediction module 212 may be external to any computing services and may receive requests for predicted launch times from any number of computing services by way of a network.

Examples of machine learning models that may be used to predict a launch time may include regression models, such as a random forest model, extremely randomized trees model, an AdaBoost model, a stochastic gradient descent model, a support vector machine model, as well as other types of machine learning models not specifically mentioned here.

A training module 222 may be configured to obtain features from various data sources that are then used to train the machine learning module 212. In one example, feature data may be retrieved from a data warehouse 224. The feature data may be launch metrics from previous computing instance launches within the computing service 202 that have been stored to the data warehouse 224. Illustratively, an information management service 238 may push (e.g., upload) launch related data to the data warehouse 224 making the data accessible to the training module 222. Data retrieved from the data warehouse 224 may be recent data (e.g., seconds, minutes or hours old) or historical data (e.g., days, weeks or months old) associated with computing instance launches.

Feature data retrieved from the data warehouse 224 may correlate with launch features 208 of a launch configuration determined to have an impact on a launch time of a computing instance. Illustratively, analysis may be performed to determine which launch features 208 of a launch configuration impact a launch time, and a query may then be constructed that selects and retrieves feature data for the launch features 208 from the data warehouse 224. In some examples, feature data for the launch features 208 may be processed into a reduced representation set of launch features (e.g., features vector) when the feature data may be large or redundant. Having obtained the launch features 208, the launch time prediction module 212 may then be trained using the launch features 208.

The launch time prediction module 212 may be initially trained using historical data and then placed in production where the launch time prediction module 212 may provide a predicted launch time according to an on demand basis. The training module 222 may be configured to obtain historical data for launch features 208 from a data warehouse 224 and provide the historical data to the launch time prediction module 212 to initially train the machine learning module 212. Subsequent training of the launch time prediction module 212 may be performed by removing the launch time prediction module 212 from production (e.g., offline) and training the launch time prediction module 212 using historical data (e.g., data from the previous day, week, month, etc.). Alternatively, subsequent training may be performed while the launch time prediction module 212 is in production (e.g., online) using recent data (e.g., data from the previous minutes, hours, day, etc.).

The launch configuration module 214 may be configured to determine a launch configuration for a computing instance in response to a launch plan or a launch request. As an illustration, a request to launch a computing instance (e.g., via a customer device 228) may be received by a control plane 240 for a computing service 202. A launch request may be for a single computing instance or any number of computing instances (e.g., tens, hundreds or thousands of computing instances). Upon receiving the launch request, a launch configuration may be determined for a computing instance that specifies, among other things, machine image features, physical host features, storage backing devices or types, network types, data center geographic region, etc. As described earlier, specifications for a launch request may be included in the launch request and/or may be obtained from a data store containing customer configurations 206. The launch configuration or a reference to the launch configuration may then be made available to other modules and processes which may utilize the launch configuration within the computing service environment 202.

The launch feature module 220 may be configured to identify launch features 208 for a launch request and provide data for the launch features 208 to the launch time prediction module 212 as part of a predicted launch time request. For example, launch features 208 may be obtained from a data store and may be used to identify specifications in the launch configuration that align with the launch features 208. Data for the launch features 208 may then be identified and obtained from the launch configuration and from other data sources, such as an information management service 238. The launch feature data may then be returned to a launch analysis module 216, which may then request a predicted launch time from the machine learning module 212, providing the launch time prediction module 212 with the launch feature data, or a reference to the launch feature data.

The launch time prediction module 212 may generate a predicted launch time via an algorithm that determines a predicted launch time by evaluating the launch feature data provided to the machine learning module 212. As one example, the launch time prediction module 212 may comprise a number of decision trees where launch feature data may be input into the decision trees, and using regression, a predicted launch time may be calculated using the output of the decision trees. The predicted launch time generated by the launch time prediction module 212 may then be provided to the launch analysis module 216, which may be configured to evaluate the launch configuration using the predicted launch time.

In one example configuration, after obtaining the predicted launch time, the launch analysis module 216 may analyze the launch configuration to determine whether an improved launch time may be achieved by modifying customer controlled specifications that are included in the launch configuration. Examples of specifications that may be within a customer's control to modify include, but are not limited to: a machine image configuration for the computing instance, a number of computing instances to be launched, a geographic region of a datacenter containing a physical host that will execute the computing instance, a computing instance type, a network type, or a computing instance scaling policy.

Launch features of the launch configuration may be selectively modified and the modified launch configuration may then be used to generate a new predicted launch time as described above. The new predicted launch time may then be compared to the original predicted launch time to determine whether the modifications to the launch configuration resulted in the new predicted launch time being faster than the original predicted launch time. In some examples, multiple iterations or multiple variations of the launch configuration may be processed to generate multiple predicted launch times, from which, the launch configuration associated with the most improved launch time may be selected and recommended to a customer.

In a case where one or more modified launch features are found to produce an improved launch time, the modified launch features may then be provided to a configuration recommendation module 244 that may be configured to provide the modified launch features to a customer. The modified launch configuration may be presented to a customer via a launch feature recommendation detailing changes that may be made to the original launch configuration and the customer may select the most desired modification to improve the launch time or decline. One example of a launch feature recommendation is provided below in relation to FIG. 5.

In one example configuration, upon launching one or more computing instances based on the recommended launch configuration or the original launch configuration, a launch progress indicator may be provided to a customer via a launch progress module 218 that uses a predicted launch time to keep a customer informed of the predicted launch progress. In one example configuration, a predicted launch time may be obtained from the machine learning module 112 when starting the launch of one or more computing instances. A graphical progress indicator, such as a progress bar or a timer, may be displayed on a customer device 228 providing a customer with visual indication of a predicted launch progress. The progress displayed by the progress indicator may be driven by the predicted launch time obtained from the machine learning module 212. In another example configuration, a predicted launch time used to drive a graphical progress indicator may be periodically updated by obtaining a new predicted launch time from the machine learning module 212. The new predicted launch time may include changes to the state of the computing service 202 that have occurred during the launch. The progress displayed in the graphical progress indicator may be modified to reflect the new predicted launch time.

A physical host 236 included in the system 200 may be a server computer configured to execute an instance manager (i.e., a hypervisor, virtual machine monitor (VMM), or another type of program) that manages multiple computing instances on a single physical host 236. The physical hosts 236 may be located in data centers in various geographical regions 210. As a result, launch times for computing instances may be influenced by the geographical region 210 of a physical host 236 selected to host a computing instance. Also, a launch time may be influenced by other attributes of a physical host 236, such as architecture, hardware brand, etc.

A machine image 242 may be a pre-configured virtual machine image (e.g., a virtual appliance) that may be executed by an instance manager. A machine image 242 may include a machine executable package for a computing instance that may include an operating system, an application server and/or various applications, any of which may influence a launch time of a computing instance. Further the machine image 242 may include mappings to remote, networked storage volumes that attach to a corresponding computing instance when the computing instance is launched.

Illustratively, machine images 242 may be stored in block level storage volumes or in a network file storage service. The storage location of a machine image 242 may influence a launch time of a computing instance. For example, when storing a machine image 242 in a networked file storage service, the machine image 242 may be compressed in order to facilitate transferring of the machine image 242 over a network. As a result, after transferring the machine image 242 to a physical host 236 selected to host a computing instance, the further operation of decompressing the machine image 242 may increase a launch time of the computing instance.

The various processes and/or other functionality contained within the system 200 may be executed on one or more processors 230 that are in communication with one or more memory modules 232. The system 200 may include a number of computing devices (e.g., physical hosts 236 and servers 204) that are arranged, for example, in one or more server banks or computer banks or other arrangements.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Various data may be stored in data stores that are accessible to the server 204. The data stored in the data stores may include launch features 208 (e.g., individual measurable properties of a computing instance launch that may be observed) associated with a current computing instance launch and customer configurations 206 (e.g., predetermined or default specifications for a launch configuration). In a case where a feature of a computing instance launch may be incapable of being measured, the feature may be correlated to another launch feature that is capable of being measured.

In some examples, a customer may utilize a customer device 228 to: request a launch of a computing instance, receive launch request recommendations, modify a launch configuration and thereafter access the computing instance.

A customer device 228 may include any device capable of sending and receiving data over a network 226. A customer device 228 may comprise, for example a processor-based system such as a computing device.

The network 226 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
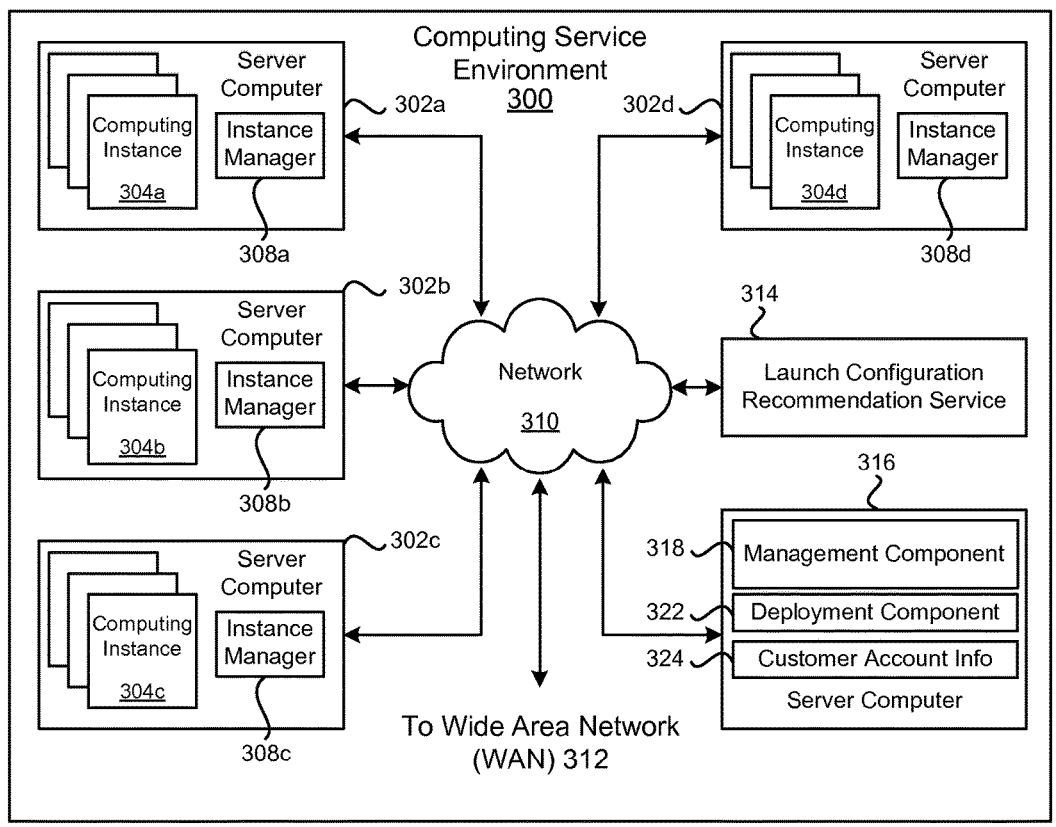
FIG. 3 is a block diagram that illustrates an example computing service environment that includes a launch configuration recommendation service.

FIG. 3 is a block diagram illustrating an example computing service environment 300 that may be used to execute and manage a number of computing instances 304*a-d*. In particular, the computing service environment 300 depicted illustrates one environment in which the technology described herein may be used. The computing service environment 300 may be one type of environment that includes various virtualized service resources that may be used, for instance, to host computing instances 304*a-d*.

The computing service environment 300 may be capable of delivery of computing, storage and networking capacity as a software service to a community of end recipients. In one example, the computing service environment 300 may be established for an organization by or on behalf of the organization. That is, the computing service environment 300 may offer a "private cloud environment." In another example, the computing service environment 300 may support a multi-tenant environment, wherein a plurality of customers may operate independently (i.e., a public cloud environment). Generally speaking, the computing service environment 300 may provide the following models: Infrastructure as a Service ("IaaS"), Platform as a Service ("PaaS"), and/or Software as a Service ("SaaS"). Other models may be provided. For the IaaS model, the computing service environment 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service environment 300. End customers may access the computing service environment 300 using networked client devices, such as desktop computers, laptops, tablets, smartphones, etc. running web browsers or other lightweight client applications, for example. Those familiar with the art will recognize that the computing service environment 300 may be described as a "cloud" environment.

The particularly illustrated computing service environment 300 may include a plurality of physical hosts 302*a-d*. While four physical hosts are shown, any number may be used, and large data centers may include thousands of physical hosts 302*a-d*. The computing service environment 300 may provide computing resources for executing computing instances 304*a-d*. Computing instances 304*a-d* may, for example, be virtual machines. A virtual machine may be an instance of a software implementation of a machine (i.e. a computer) that executes applications like a physical machine. In the example of a virtual machine, each of the physical hosts 302*a-d* may be configured to execute an instance manager 308*a-d* capable of executing the instances. The instance manager 308*a-d* may be a hypervisor, virtual machine monitor (VMM), or another type of program configured to enable the execution of multiple computing instances 304*a-d* on a single physical host. Additionally, each of the computing instances 304*a-d* may be configured to execute one or more applications.

One or more server computers 314 and 316 may be reserved to execute software components for managing the operation of the computing service environment 300 and the computing instances 304*a-d*. For example, a server computer 314 may execute a launch configuration recommendation service that may provide a customer with a recommended launch configuration based on a predicted launch time for the recommended launch configuration, as described earlier.

A server computer 316 may execute a management component 318. A customer may access the management component 318 to configure various aspects of the operation of the computing instances 304*a-d* purchased by a customer. For example, the customer may setup computing instances 304*a-d* and make changes to the configuration of the computing instances 304*a-d*.

A deployment component 322 may be used to assist customers in the deployment of computing instances 304*a-d*. The deployment component 322 may have access to account information associated with the computing instances 304*a-d*, such as the name of an owner of the account, credit card information, country of the owner, etc. The deployment component 322 may receive a configuration from a customer that includes data describing how computing instances 304*a-d* may be configured. For example, the configuration may include an operating system, provide one or more applications to be installed in computing instances 304*a-d*, provide scripts and/or other types of code to be executed for configuring computing instances 304*a-d*, provide cache logic specifying how an application cache should be prepared, and other types of information. The deployment component 322 may utilize the customer-provided configuration and cache logic to configure, prime, and launch computing instances 304*a-d*. The configuration, cache logic, and other information may be specified by a customer accessing the management component 318 or by providing this information directly to the deployment component 322.

Customer account information 324 may include any desired information associated with a customer of the multitenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service environment 300, the physical hosts 302*a-d* and the server computers 316. The network 310 may be a local area network (LAN) and may be connected to a Wide Area Network (WAN) 312 or the Internet, so that end customers may access the computing service environment 300. The network topology illustrated in FIG. 3 has been simplified, many more networks and networking devices may be utilized to interconnect the various computing systems disclosed herein.

Figure 4:
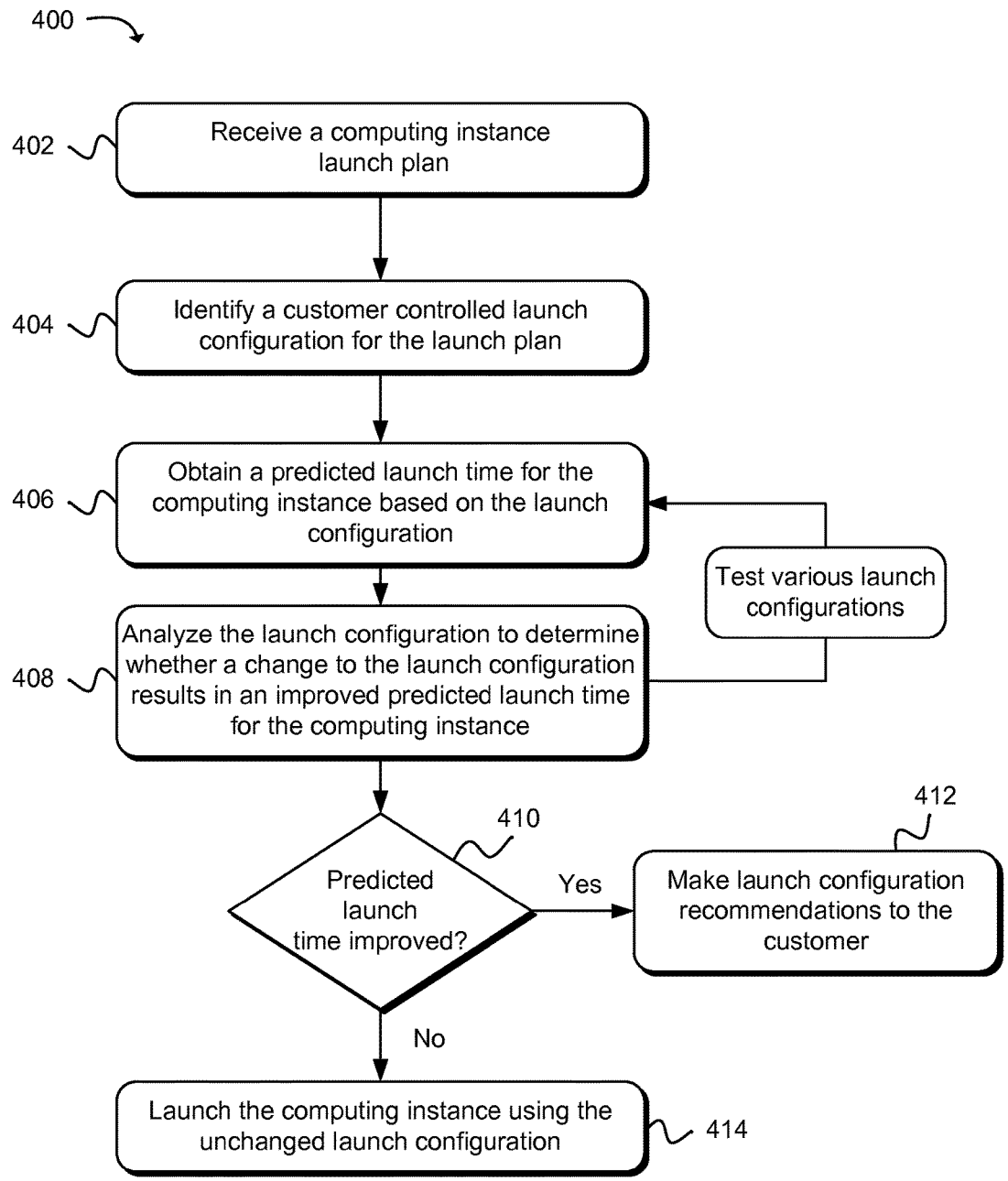
FIG. 4 is a diagram illustrating an example method for determining a recommended launch configuration using a predicted launch time.

Moving now to FIG. 4, a diagram illustrates an example method 400 for providing a customer with a recommendation for a launch configuration that may be determined using a predicted launch time. Beginning in block 402, a launch plan may be received for a launch of one or more computing instances within a computing service. For example, the launch plan may be provided by a customer wishing to receive launch configuration recommendations for launching one computing instance or a group of computing instances within the computing service environment.

As in block 404, upon receiving the launch plan, a launch service may identify a launch configuration for the one or more computing instances to be launched. As described earlier, various specifications included in a launch configuration may be within the control of a customer. As a result, a launch time may be influenced by the customer controlled specifications. In one example, launch features corresponding to customer controlled specifications of a launch configuration may be identified. The launch features may be launch features that have been determined to have an impact on a launch time of a computing instance. The customer controlled launch features, for example, may be categorized as machine image launch features, physical host launch features, private network launch features and/or computing instance launch features.

After identifying the launch features for the launch configuration, data for the launch features may be obtained and may be provided to a predicted launch time service for the purpose, as in block 406, to obtain a predicted launch time for the computing instance. For example, a request may be made to the predicted launch time service that generates a predicted launch time as described earlier. As an illustration, the request for the predicted launch time may include launch feature data or a reference to the launch feature data. The predicted launch time service may then generate a predicted launch time for the one or more computing instances by inputting the launch feature data into a machine learning model that outputs a predicted launch time.

As in block 408, the launch configuration may then be analyzed to determine whether a change to the launch configuration may result in an improved predicted launch time for the computing instance. As described earlier, various changes may be made to the launch configuration and a new predicted launch time may be obtained for the modified launch configuration. As in block 410, the predicted launch time may then be compared with the new predicted launch time to determine whether the change to the launch configuration resulted in an improved launch time.

In a case where the change to the launch configuration did not result in an improved predicted launch time, as in block 414, a launch request may be performed using the original (i.e., unchanged) launch configuration. In a case where the modified launch configuration did result in an improved predicted launch time, as in block 412, a recommendation for the modified launch configuration may be made to the customer.

Figure 5:
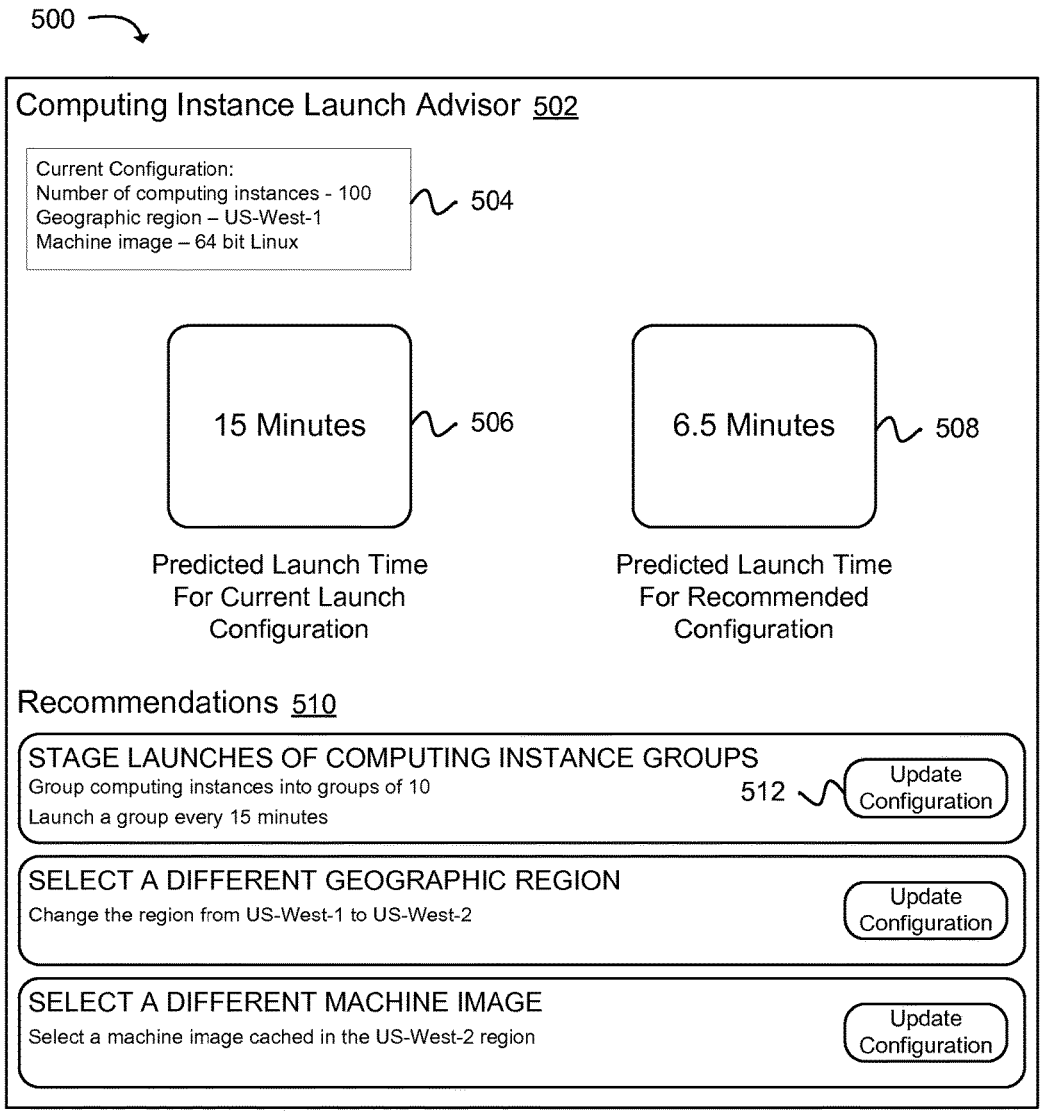
FIG. 5 is a diagram that illustrates an example graphical user interface showing recommendations for a launch configuration.

FIG. 5 is a diagram that illustrates an example of a graphical user interface 500 providing a customer with suggested changes to a launch configuration that may result in an improved predicted launch time. As illustrated, the graphical user interface 500 may include a computing instance launch advisor 502 providing a customer with the current configuration of a launch configuration 504, a predicted launch time based on the current launch configuration 506, a predicted launch time based on a recommended launch configuration 508 and details of recommendations 510 that may be made to the current configuration of the launch configuration 504.

In one example configuration, listed recommendations 510 may include a control 512 that enables a customer to accept a recommendation and update the launch configuration with the recommendation. As an illustration, a recommendation may be provided that recommends that a group of computing instances be divided into smaller groups and launched every few minutes. A customer may accept the recommendation by selecting an associated control 512, whereupon the launch configuration may be updated according to the recommendation.

Figure 6:
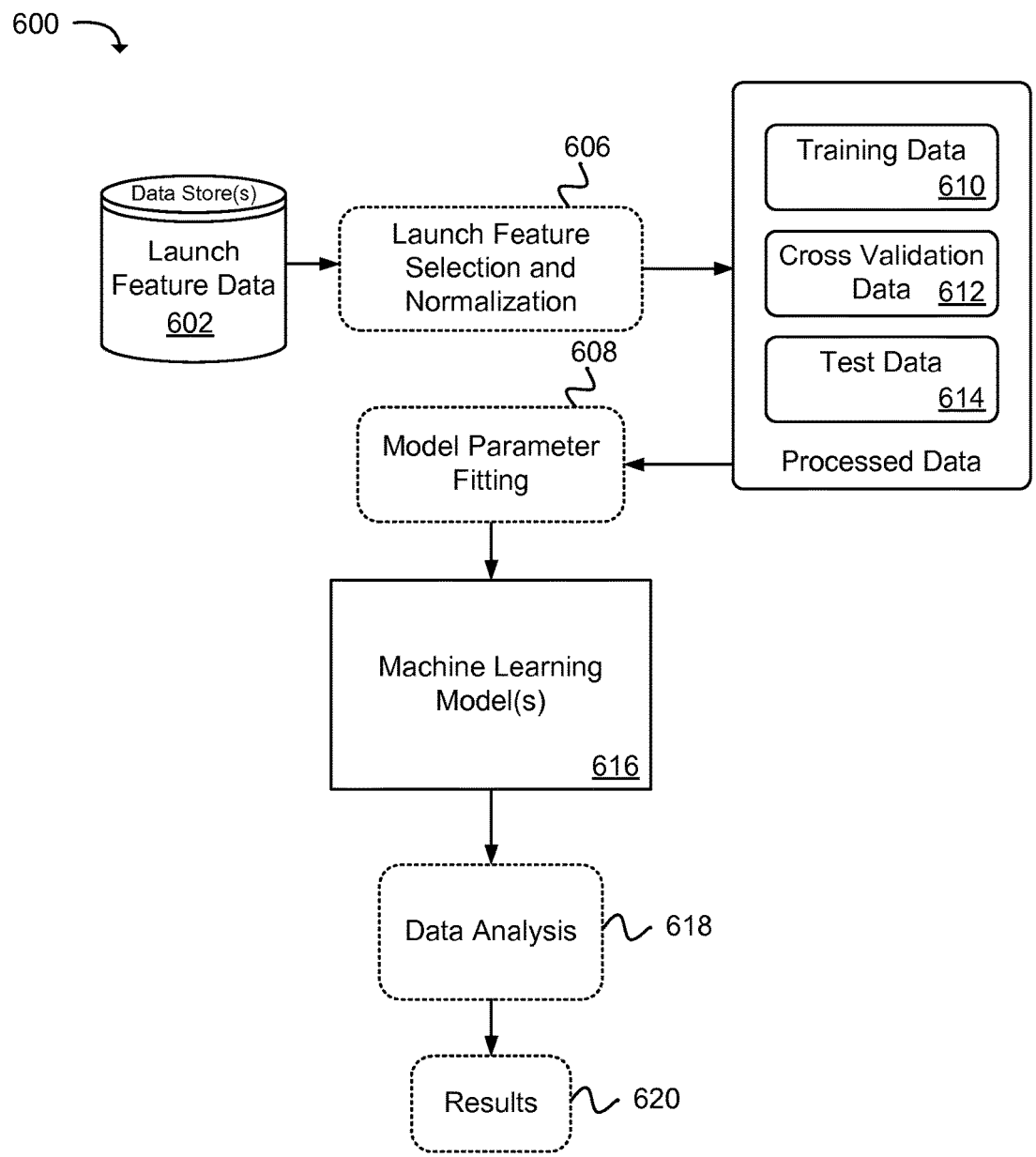
FIG. 6 is a diagram illustrating an example method for configuring and training a machine learning model used to generate a predicted launch time.

FIG. 6 is a flow diagram illustrating one example of a method 600 for configuring and training a machine learning model 616 used to generate a predicted launch time. As in block 606, launch feature selection may be performed by analyzing various computing instance launches to determine launch features that have an impact on a computing instance launch time. For example, various features of launching a computing instance on a physical host within a computing service environment, where the features are capable of being observed, may be identified.

Examples of launch features may include, but are not limited to: contending computing instances on a physical host, a number of running computing instances on a physical host, a count of running computing instances on a physical host at the start and the end of the computing instance launch, a data store type containing a machine image used to create a computing instance, a kernel image used by a computing instance, an architecture of a physical host, a virtualization type of a computing instance, a maximum number of computing instances that a physical host is capable of hosting, a percentage of occupancy of a physical host by computing instances at a start of a computing instance launch, a geographical region where a physical host is located, a hardware type of a physical host, a hardware vendor of a physical host, and an operating system, networking type, data store and size of a computing instance.

Launch features determined to have an impact on a launch time of a computing instance may be categorized. For example, categories of launch features may be based on various aspects of a computing instance launch. As an illustration, launch features may be categorized into machine image launch features, physical host launch features and customer configuration launch features.

In one example, identified launch features may be sorted or ranked according to an impact of a launch feature on a computing instance launch time and those launch features having the greatest impact on launch time may be selected as features to be used for predicting launch times. For example, launch features may be analyzed to determine a percentage of contribution that an individual launch feature has on a launch time. Launch features identified as having the greatest contribution on a launch time may be selected as input to a machine learning model. It should be noted that any number of launch features may be selected and the selection of the launch features may not be limited to just those launch features having the greatest impact on a launch time.

Having identified the launch features, launch feature data 602 for the launch features may then be obtained from data sources containing data associated with the launch features. As illustrated, launch feature data 602 may be obtained from a data store containing, for example, computing service management data, inventory service data (e.g., physical host information), as well as other data associated with a computing service. The launch feature data 602 may be normalized enabling launch feature data 602 obtained from different data sources to be input into the machine learning model 616. The launch feature data 602 may be divided into training data 610, cross validation data 612 and test data 614. For example, a percentage of the launch feature data 602 may be randomly selected as test data 614 and cross validation data 612, and the remaining launch feature data 602 may be used as training data 610 to train the machine learning model 616.

The machine learning model 616 may be selected from among any available machine learning algorithm. In one example, a number of regression machine learning models may be tested to determine a machine learning model that provides an acceptable approximation of a launch time. One aspect of generating machine learning models may be, as in block 608, performing a parameter value search for machine learning parameters that result in a goodness-of-fit of the machine learning model 616 to the launch features. Machine learning parameters (i.e., parameters used to configure a machine learning model 616, such as setting a depth of a decision tree) may affect how a machine learning model 616 fits the training data 610. In one example, grid search or a gradient descent algorithm may be used to perform a parameter value search. In another example, an evolutionary algorithm (e.g., a distributed genetic algorithm), a swarm algorithm (e.g., particle swarm optimization), simulated annealing or like algorithms may be used when a parameter space of a machine learning model 616 may be too large to perform a thorough parameter value search.

After selecting a machine learning model 616, the machine learning model 616 may be trained using the training data 610. The cross validation data 612 and the test data 614 may then be run through the machine learning model 616 to test whether the outputs of the machine learning model are representative for additional historical cases. Thereafter, as in block 618, data analysis may be performed to determine how well the machine learning model 616 was able to predict a launch time compared to an actual launch time. After testing two or more machine learning models 616, as in block 620, the results of the machine learning models 616 may be compared to identify the better performing machine learning model 616, which may then be selected and placed in a production environment.

Figure 7:
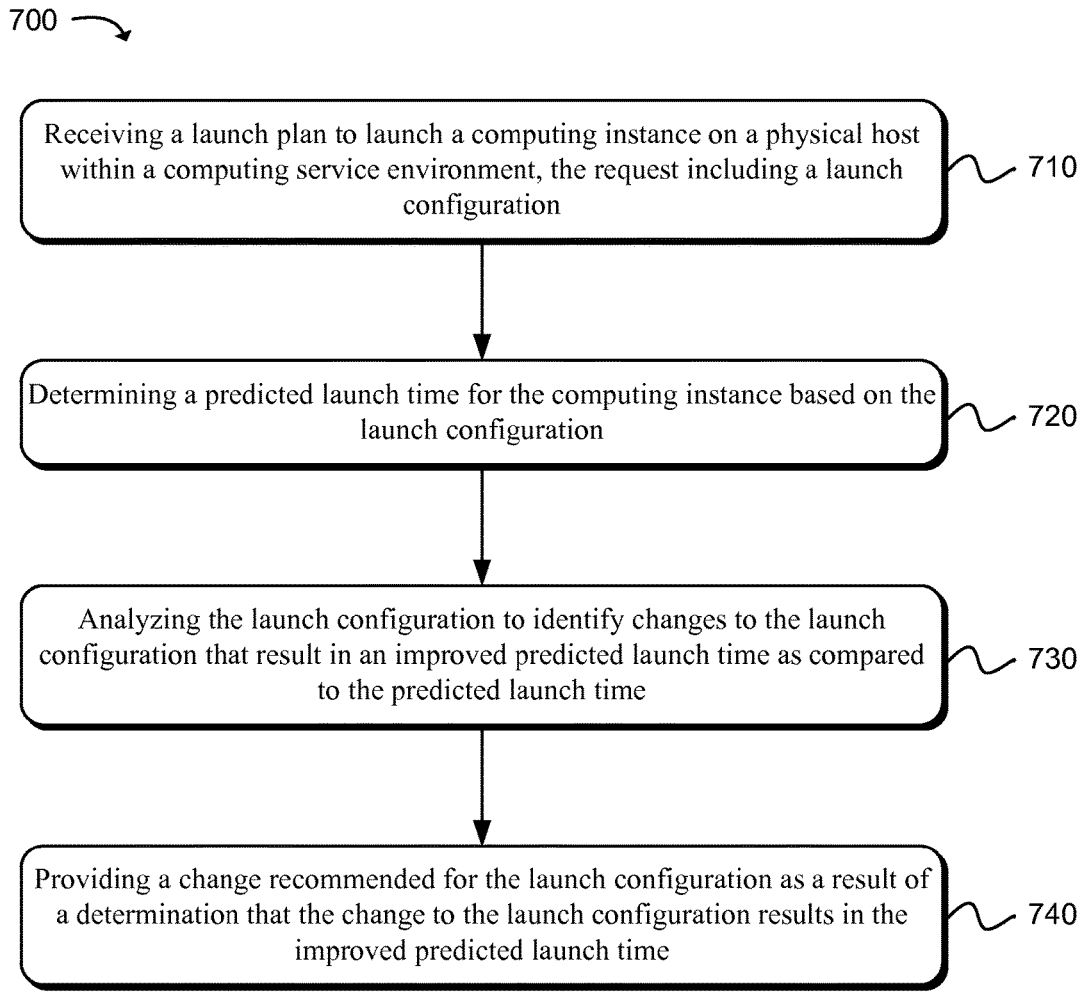
FIG. 7 is a flow diagram that illustrates an example method for determining a recommended launch configuration using a predicted launch time.

FIG. 7 is a flow diagram illustrating an example method 700 for providing a recommended launch configuration based on a predicted launch time. Beginning in block 710, a launch plan to launch a computing instance on a physical host within a computing service environment may be received where the launch plan may include a launch configuration providing specifications for launching the computing instance.

After receiving the launch plan, a predicted launch time may be determined for the computing instance based on the launch configuration, as in block 720. The predicted launch time may be a time in which a computing instance is in a pending state (i.e., executing service calls to setup computing instance resources, identifying a physical host to host the computing instance and creating the computing instance on the physical host) to a time in which the computing instance is in an executing state (i.e., start of booting the computing instance). It is noted that in some examples, a time in which a customer receives a usable computing instance (e.g., a booted computing instance) may be included in a predicted launch time by including a boot time for the computing instance.

In determining the predicted launch time, launch features may be identified and data associated with the launch features may be obtained from the launch configuration (i.e., specification data included in the launch configuration that aligns with the launch features), as well as from other data sources containing data related to the launch features. The launch features may be launch features within a customer's control determined to have an impact on a launch time of the computing instance. The launch features (i.e., the data for the launch features) may then be input to a machine learning model that outputs a predicted launch time for launching the computing instance on a selected physical host according to the launch configuration.

As in block 730, the launch configuration may be analyzed to identify changes to the launch configuration that may result in an improved predicted launch time as compared to the predicted launch time. Illustratively, one or more changes may be made to the launch configuration, whereupon a new predicted launch time may be generated based on the updated launch configuration. The new predicted launch time may then be compared to the original launch time to determine whether the new predicted launch time is an improvement over the original predicted launch time.

In a case where a change to the launch configuration results in an improved launch time, as in block 740, a recommended change to the launch configuration that resulted in the improved launch time may be provided via an automated notification when a determination may be made that the change to the launch configuration results in the improved predicted launch time. In one example, the automated notification for the recommended change may be displayed to a graphical user interface that provides a customer with information about changes to the launch configuration that result in an improved predicted launch time. For example, the recommendation may be displayed in an electronic page that provides a customer with a computing instance launch advisor, allowing the customer to accept or reject the launch configuration recommendation.

Figure 8:
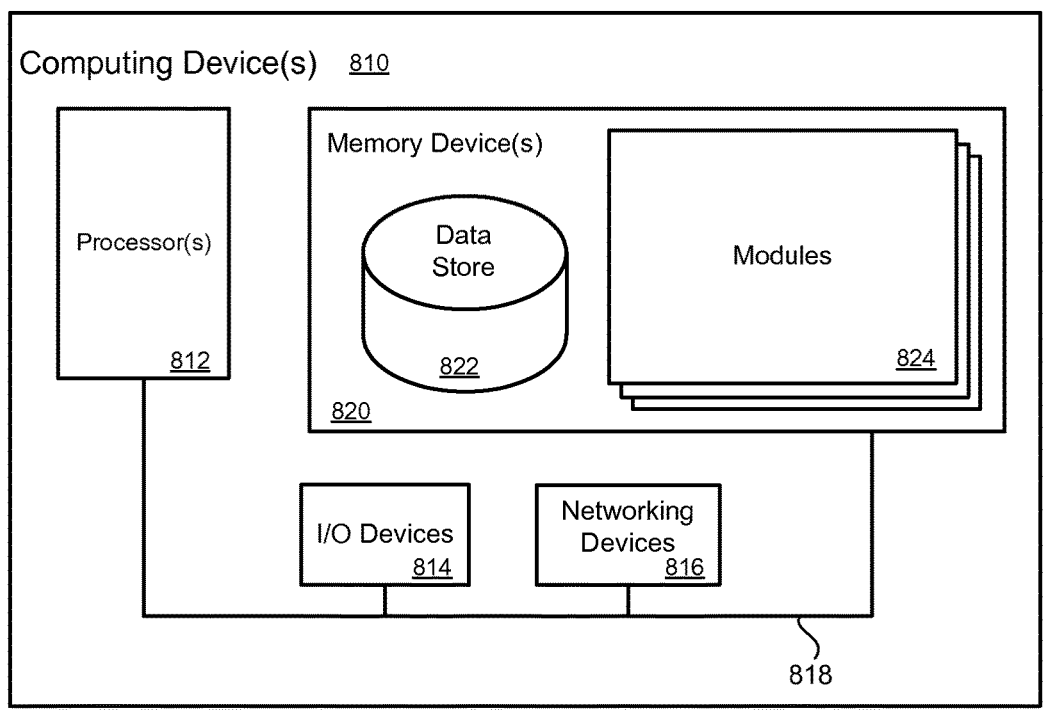
FIG. 8 is block diagram illustrating an example of a computing device that may be used to execute a method for determining a recommended launch configuration.

FIG. 8 illustrates a computing device 810 on which modules of this technology may execute. A computing device 810 is illustrated on which a high level example of the technology may be executed. The computing device 810 may include one or more processors 812 that are in communication with a plurality of memory devices 820. The computing device 810 may include a local communication interface 818 for the components in the computing device. For example, the local communication interface 818 may be a local data bus and/or any related address or control busses as may be desired.

A memory device 820 may contain modules 824 that are executable by the processor(s) 812 and data for the modules 824. For example, a memory device 820 may contain machine learning module, a launch configuration module, a launch analysis module, a launch progress module, a training module, a launch feature module, a configuration recommendation module, as well as other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
    receive a launch plan for a computing instance, wherein the launch plan includes a launch configuration for the computing instance selected by a customer;
    determine a predicted launch time to launch the computing instance on a physical host within a computing service environment, wherein launch features for the launch configuration are submitted to a machine learning model that outputs the predicted launch time for the computing instance;
    identify a change to the launch configuration to improve the predicted launch time for the computing instance;
    analyze the launch configuration to determine whether the change to the launch configuration results in an improved predicted launch time of the computing instance as compared to the launch configuration initially provided;
    recommend the change to the launch configuration via an automated notification when a determination is made that the change results in the improved predicted launch time; and
    initiate a launch of the computing instance on the physical host using an updated launch configuration that includes the change to the launch configuration upon acceptance of the change to the launch configuration.

2. The non-transitory machine readable storage medium in claim 1, wherein instructions that when executed by the processor determine a new predicted launch time using the change to the launch configuration.

3. The non-transitory machine readable storage medium in claim 1, wherein instructions that when executed by the processor display the change to the launch configuration in an interactive graphical user interface enabling the customer to select and apply the change.

4. A computer implemented method, comprising:
    under control of one or more computer systems configured with executable instructions, receiving a launch plan to launch a computing instance on a physical host within a computing service environment, wherein the launch plan includes a launch configuration;
    determining a predicted launch time for the computing instance using the launch configuration;

analyzing the launch configuration to identify changes to the launch configuration that result in an improved predicted launch time to launch the computing instance as compared to the predicted launch time previously determined;

providing a recommended launch configuration as a result of a determination that the change to the launch configuration results in the improved predicted launch time; and initiating a launch of the computing instance on the physical host using the recommended launch configuration.

5. The method in claim 4, wherein analyzing the launch configuration further comprises, determining the predicted launch time by supplying launch features for the launch configuration determined to have an impact on a launch time of the computing instance to a machine learning model which outputs the predicted launch time.

6. The method in claim 4, further comprising classifying customer configured features of the launch configuration into launch features that are determined to have an impact on a launch time of the computing instance into the launch features being divided into: machine image launch features, physical host launch features, private network launch features and computing instance launch features.

7. The method in claim 4, further comprising recommending a change to the launch configuration that is within the control of a customer to modify.

8. The method in claim 4, further comprising recommending a staged timetable to launch a plurality of computing instances in response to a determination that the staged timetable will result in the improved predicted launch time.

9. The method in claim 4, further comprising recommending a machine image configuration in response to a determination that the machine image configuration will result in the improved predicted launch time.

10. The method in claim 4, further comprising recommending a datacenter in a geographic region containing a physical host that will execute the computing instance in response to a determination that selection of the datacenter will result in the improved predicted launch time.

11. The method in claim 5, further comprising performing a parameter value search for machine learning parameters that result in a goodness-of-fit of the machine learning model to the launch features.

12. The method in claim 5, further comprising obtaining training data representing launch features for a plurality of previous computing instance launches and training the machine learning model using the launch features.

13. The method in claim 4, wherein analyzing the launch configuration further comprises, determining the predicted launch time using a machine learning model selected from one of: a random forest model, an extremely randomized trees model, an AdaBoost model, a stochastic gradient descent model or a support vector machine model.

14. The method in claim 4, wherein analyzing the launch configuration further comprises, determining the predicted launch time by inputting launch features of the launch configuration to a machine learning regression model.

15. The method in claim 4, further comprising providing a progress indicator associated with a computing instance launch where a launch progress displayed in the progress indicator is determined by the predicted launch time.

16. The method in claim 4, further comprising providing an automated notification for a recommended change to a graphical user interface that provides a customer with information about changes to the launch configuration that are predicted to result in the improved predicted launch time.

17. The method in claim 16, further comprising applying the recommended change to the launch configuration as a result of the customer selecting an associated user interface control in the graphical user interface.

18. A system comprising:
at least one processor;
a memory device including instructions that, when executed by the at least one processor, cause the system to:
receive a launch plan to launch a computing instance on a physical host within a computing service environment;
determine a predicted launch time to launch the computing instance, wherein launch features that correlate with a computing instance configuration are input to a machine learning regression model that outputs the predicted launch time for the computing instance;
analyze the computing instance configuration to determine whether changes to the computing instance configuration result in an improved predicted launch time of the computing instance;
recommend a change to the computing instance configuration that results in the improved predicted launch time; and
initiate a launch of the computing instance on the physical host using an updated launch configuration that includes the change to the computing instance configuration in response to an acceptance of the change to the computing instance configuration.

19. The system in claim 18, wherein the memory device includes instructions that, when executed by the processor, cause the system to provide a user interface that displays the change recommended to the computing instance configuration.

20. The system in claim 18, wherein the memory device includes instructions that, when executed by the processor, cause the system to provide a progress indicator associated with a computing instance launch where a launch progress displayed in the progress indicator is determined by the predicted launch time.

* * * * *